United States Patent [19]

Röhringer et al.

[11] Patent Number: 5,765,593
[45] Date of Patent: Jun. 16, 1998

[54] SERVO VALVE ARRANGEMENT

[75] Inventors: Arno Röhringer, Ditzingen; Manfred Rombold, Winnenden, both of Germany

[73] Assignee: Mercedes-Benz AG, Stuttgart, Germany

[21] Appl. No.: 844,825

[22] Filed: Apr. 22, 1997

[30] Foreign Application Priority Data

Apr. 25, 1996 [DE] Germany ............... 196 16 438.9

[51] Int. Cl.⁶ ....................................... F15B 9/10
[52] U.S. Cl. ........................... 137/625.23; 91/375 A
[58] Field of Search ................. 91/375 A; 137/625.23

[56] References Cited

U.S. PATENT DOCUMENTS

| | | | |
|---|---|---|---|
| 3,145,626 | 8/1964 | Vickers et al. | 137/625.24 X |
| 4,063,490 | 12/1977 | Duffy | 91/375 A X |
| 4,671,747 | 6/1987 | Arbjerg | |
| 4,966,192 | 10/1990 | Umeda | 137/625.23 |
| 5,046,574 | 9/1991 | Goodrich et al. | 91/375 A X |

FOREIGN PATENT DOCUMENTS

| | | |
|---|---|---|
| 42 41 531 | 6/1994 | Germany. |
| 1 366 274 | 9/1974 | United Kingdom. |
| 1 545 143 | 5/1979 | United Kingdom. |

*Primary Examiner*—Gerald A. Michalsky
*Attorney, Agent, or Firm*—Klaus J. Bach

[57] ABSTRACT

In a servo valve arrangement for hydraulic power assisted steering systems in motor vehicles comprising a rotary spool connected to a steering shaft and a control sleeve receiving the rotary spool so as to permit some relative rotation between the control sleeve and the rotary spool, an axial endpiece is coupled to the rotary sleeve for rotation therewith by an articulated joint structure so as to accommodate any misalignment in the steering system.

3 Claims, 1 Drawing Sheet

SERVO VALVE ARRANGEMENT

BACKGROUND OF THE INVENTION

The invention relates to a servo valve arrangement, in particular for hydraulic power-assisted steering systems in motor vehicles, in the form of a rotary spool arrangement which can be mounted, as part of a shaft train, in a steering column and has a spool disposed in a control sleeve so as to be rotatable relative to the control sleeve to a limited extent.

Servo valve arrangements of this type are generally known and are used serially in motor vehicle power steering systems. An example is shown in DE 42 41 531 C1, which is assigned to the assignee of the present application. It is advantageous if the servo valve arrangement can form a part of the steering column, i.e. the servo valve arrangement also serves to transmit torques between a steering wheel and a steering transmission which connects the steering column to the steered vehicle wheels.

It is the object of the invention to further simplify the assembly of the servo valve arrangement so as to facilitate the manufacture of a motor vehicle.

SUMMARY OF THE INVENTION

In a servo valve arrangement for hydraulic power assisted steering systems in motor vehicles comprising a rotary spool connected to a steering shaft and a control sleeve receiving the rotary spool so as to permit some relative rotation between the control sleeve and the rotary spool, an axial endpiece is coupled to the rotary sleeve for rotation therewith by an articulated joint structure so as to accommodate any misalignment in the steering system.

With this arrangement, the rotary spool structure is not subject to any bending forces, as they may occur with the unavoidable production tolerances during the installation of a steering column in a motor vehicle. Since, with the arrangement according to the invention, the rotary spool structure includes an articulation, slight tilting of the steering column can not lead to any undesirable friction in the rotary spool arrangement, thus obviating the need for monitoring an accurate alignment of the steering column elements during assembly of the steering column.

In a preferred embodiment of the invention, a hollow-shaft piece is coupled via a universal joint to the control sleeve of the rotary spool arrangement. This provides for a comparatively large cross-section for making the universal joint.

In particular, the universal joint can then readily be provided in the form of a claw coupling, the claws being arranged on one part, e.g. on the control sleeve. The claws have convexly curved flanks to transmit the torque to the flanks of the counter-claws on the other joint part, e.g. on the hollow shaft piece in order to permit slight tilting of the joint parts relative to one another without generating bending forces.

The invention will be described below in greater detail on the basis of the accompanying drawings.

DETAILED DESCRIPTION OF THE DRAWINGS

Figure 1:
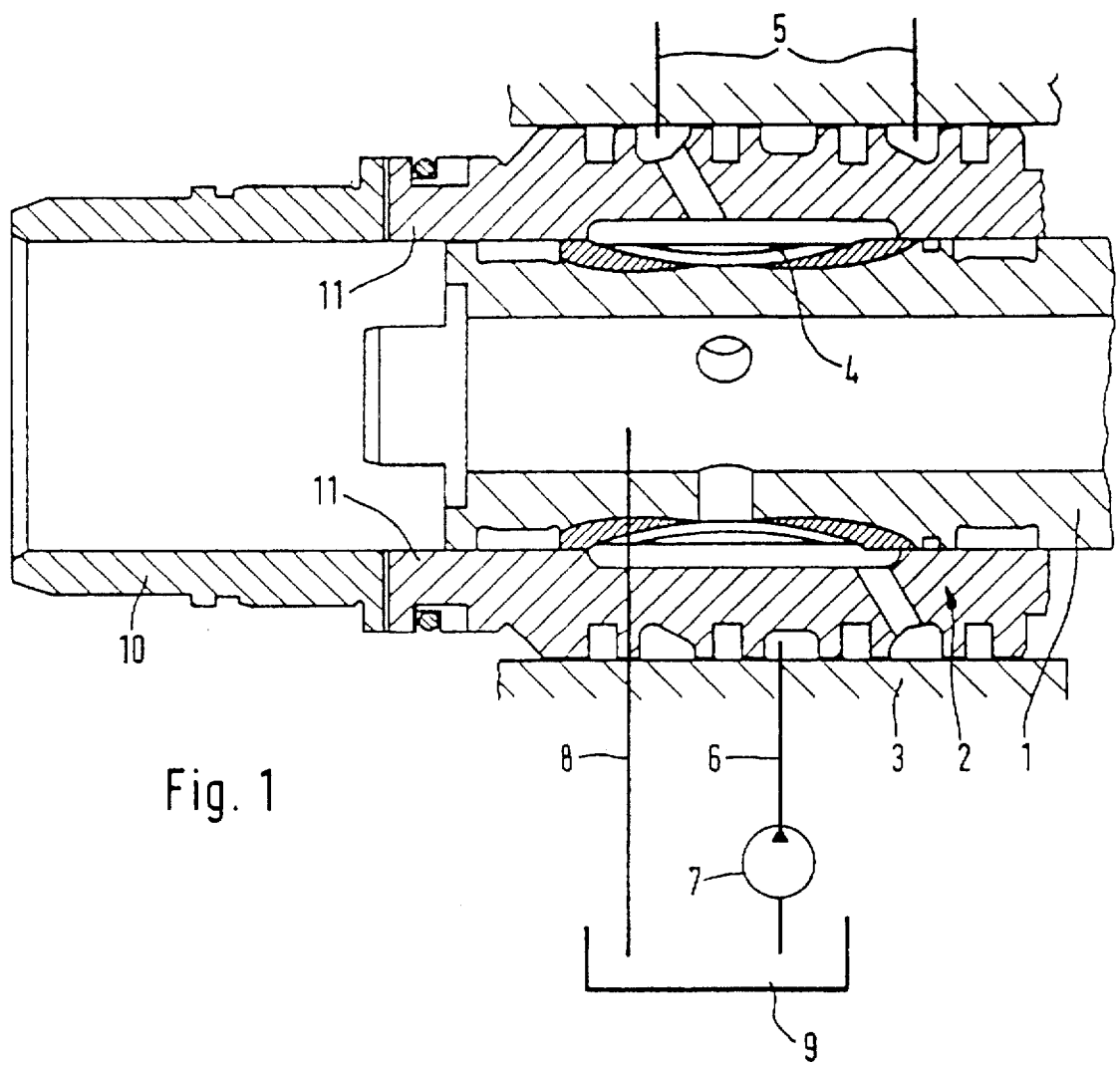
FIG. 1 shows the rotary spool valve arrangement in a diagrammatic axial view.

As shown in FIG. 1, a rotary spool 1 is surrounded by a coaxial control sleeve 2 which is rotatably supported within a housing 3 (indicated only schematically).

The rotary spool 1 and the control sleeve 2 can be rotated relative to one another to a limited extent as a result of which axial control edges 4 which interact with one another and are arranged on the rotary spool 1 and on the control sleeve 2 are moved relative to one another. This results in a controllable pressure difference occurring in one or the opposite direction, depending on the relative direction of rotation of the rotary spool 1 and the control sleeve 2, between two fluid control ports 5 (illustrated only schematically). The fluid control ports 5 are hydraulically connected between a fluid pressure port 6 (illustrated only schematically) of a hydraulic pump 7 and a port 8 (likewise illustrated only schematically) for returning hydraulic fluid to a hydraulic reservoir 9 which is connected to the suction side of the pump 7. This arrangement, however, is known in principle and is therefore not described in greater detail.

According to the invention, the control sleeve 2 is coupled securely with a hollow shaft piece 10 in an articulated manner for rotation with the shaft piece 10.

Figure 2:
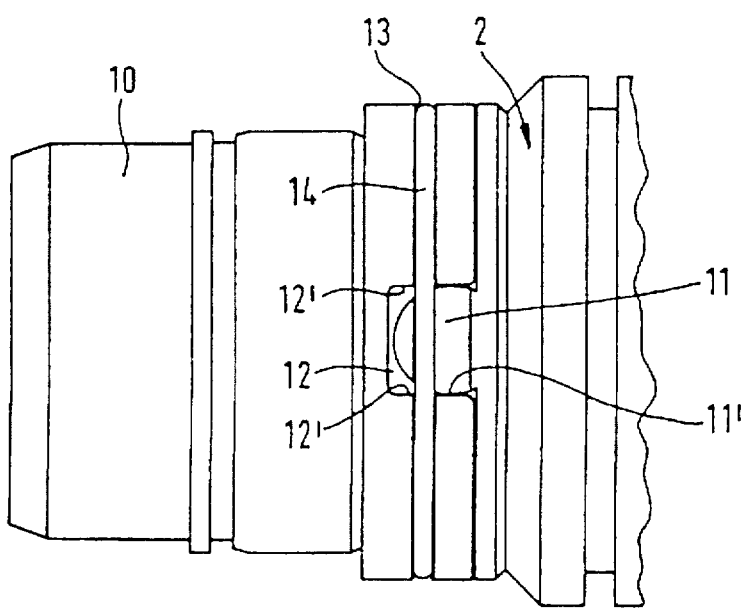
FIG. 2 is a plain side view showing the left end portion of the rotary spool valve arrangement shown in FIG. 1.

The articulated connection between the control sleeve 2 and the hollow shaft piece 10 is in the form of a claw coupling. For this purpose, claw-like projections 11 are arranged on the control sleeve 2 as shown in FIG. 2. The flanks 11' of the projections are convexly curved in a roller-like manner, the axis of curvature being perpendicular to the longitudinal axis of the control sleeve 2. These projections 11 are received, without play, in axial slots 12 formed into the end face of the hollow shaft piece 10 facing the control sleeve 2. The slots 12 in the hollow shaft piece 10 are both open toward the control sleeve. In this case, the side faces 12' of the axial slots 12 which interact with the flanks 11' of the projections 11 for torque transmission between the hollow shaft piece 10 and the control sleeve 2 are designed as flat faces which are parallel to one another and each extend parallel to an axial center plane of the respective axial slot 12 containing the longitudinal axis of the hollow shaft piece.

The hollow shaft piece 10 has an outer circumferential groove 13 which receives a spring ring 14. The projections 11 of the control sleeve 2 have, on their radially outer side, a similar groove, but with a greater width in the axial direction of the control sleeve 2, so that the projections 11 have a certain mobility in the axial direction of the control sleeve 2 relative to the spring ring 14. However, they still captively connect the control sleeve 2 to the hollow shaft piece 10 in interaction with the spring ring 14.

The illustrated arrangement of the hollow shaft piece 10 permits limited tilting between the hollow shaft piece 10 and the control sleeve 2 of not more than 1°. If the rotary spool 1 and the control sleeve 2 are now arranged as part of the shaft train of a steering column of a vehicle, no bending stresses can occur between the spool 1 and the control sleeve 2 even if a shaft part of the shaft train or of the steering column which is fixedly connected to the rotary spool 1 and a shaft part which is connected to the hollow shaft piece 10 are not accurately aligned. By avoiding bending stress, the friction between the rotary spool 1 and the control sleeve 2 is also kept at a minimum. Corresponding to the low friction between the rotary spool 1 and the control sleeve 2, also only a small hysteresis can occur in the control characteristics of the rotary spool and control sleeve arrangement.

What is claimed is:

1. A servo valve arrangement, for hydraulic power-assisted steering systems in motor vehicles, comprising a rotary spool connected in a steering column shaft, and a control sleeve receiving said rotary spool so as to permit some relative rotation between said control sleeve and said rotary spool, an axial end piece attached to said rotary sleeve for rotation therewith, and an joint structure formed between said rotary sleeve and said axial end piece to provide for articulation between said rotary sleeve and said axial end piece, said joint structure comprising a claw coupling including claws arranged on one of said endpiece and said control sleeve and having convexly curved flanks engaged in an axial recess formed on the other of said end piece and said control sleeve for torque transmission, and a ring disposed in a groove extending circumferentially around said claw coupling for holding said claws in said recesses.

2. A servo valve arrangement according to claim 1, wherein said flanks have a roller-like curvature with an axis of curvature extending perpendicular to the axis of said rotary spool.

3. A servo valve arrangement according to claim 1 wherein said articulated joint is capable of accommodating only very small maximum tilting angles of not more than 1°.

* * * * *